US012664559B1

(12) United States Patent
Smith et al.

(10) Patent No.: US 12,664,559 B1
(45) Date of Patent: Jun. 23, 2026

(54) SYSTEM AND METHOD FOR PROACTIVE CUSTOMER ENGAGEMENT EXPERIENCES

(71) Applicant: UIPCO, LLC, San Antonio, TX (US)

(72) Inventors: Brian Smith, San Antonio, TX (US); Samantha Kameleonalani Sprague, Phoenix, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 126 days.

(21) Appl. No.: 18/585,744

(22) Filed: Feb. 23, 2024

Related U.S. Application Data

(62) Division of application No. 17/804,620, filed on May 31, 2022, now Pat. No. 11,989,736.

(51) Int. Cl.
| | |
|---|---|
| *G06Q 20/20* | (2012.01) |
| *G06Q 20/40* | (2012.01) |
| *G06Q 30/016* | (2023.01) |
| *G06Q 40/08* | (2012.01) |
| *G07G 3/00* | (2006.01) |

(52) U.S. Cl.
CPC ........... *G06Q 30/016* (2013.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 2010/0257007 A1* | 10/2010 | Chan | ................... | G06Q 10/063 |
| | | | | 705/7.11 |
| 2011/0077994 A1* | 3/2011 | Segev | ................... | G06Q 10/06 |
| | | | | 703/2 |
| 2011/0225485 A1* | 9/2011 | Schnitt | ................. | G06F 40/174 |
| | | | | 715/224 |
| 2013/0080362 A1* | 3/2013 | Chang | ................ | G06Q 30/0202 |
| | | | | 706/21 |
| 2021/0279617 A1* | 9/2021 | Stubbs | ..................... | G06N 5/01 |
| 2023/0260048 A1* | 8/2023 | Hayward | .............. | G06Q 40/08 |
| | | | | 705/4 |

OTHER PUBLICATIONS

Non-Final Office Action mailed Jun. 6, 2023 for U.S. Appl. No. 17/804,620.
Non-Final Office Action mailed Aug. 4, 2023 for U.S. Appl. No. 17/804,620.
Notice of Allowance mailed Jan. 23, 2024 for U.S. Appl. No. 17/804,620.

* cited by examiner

*Primary Examiner* — Florian M Zeender
(74) *Attorney, Agent, or Firm* — Plumsea Law Group, LLC

(57) ABSTRACT

A method and system of providing customer-specific information and guidance to insurance policyholders during claims processing. The information is created based on outputs from a claims complexity model, customer segmentation model, and claims service level objective (SLO) model. The resulting information is tailored to the individual policyholder and their claim, and includes a summary of their claim activity, guidance regarding their next steps, and predicted wait times for each stage in their claim's processing. In some embodiments, the information is presented as messaging delivered over the policyholder's preferred communication channel(s) that can differ based on which stage of the claims process the claim is in.

11 Claims, 11 Drawing Sheets

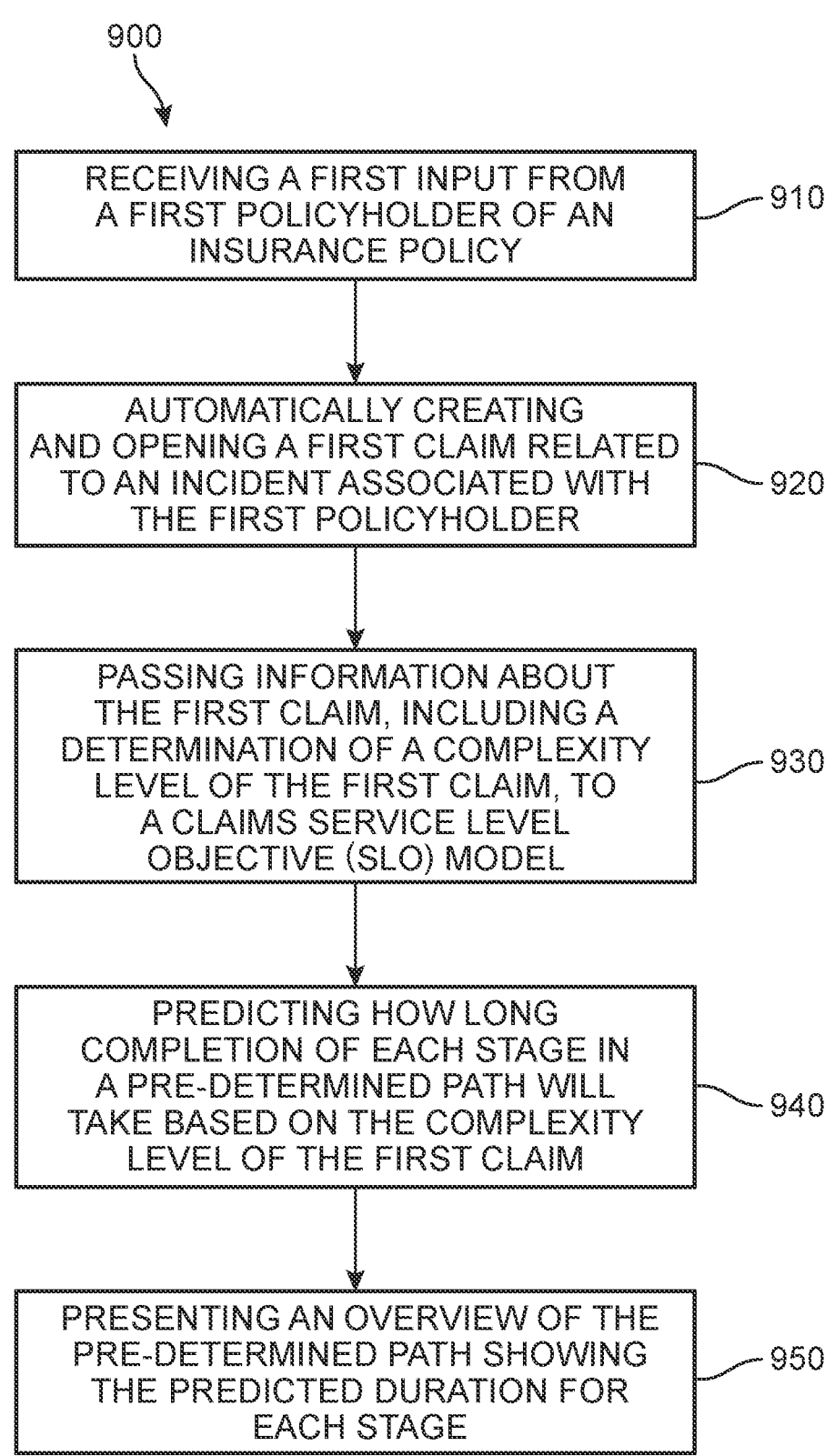

900

RECEIVING A FIRST INPUT FROM
A FIRST POLICYHOLDER OF AN
INSURANCE POLICY ⟵ 910

AUTOMATICALLY CREATING
AND OPENING A FIRST CLAIM RELATED
TO AN INCIDENT ASSOCIATED WITH
THE FIRST POLICYHOLDER ⟵ 920

PASSING INFORMATION ABOUT
THE FIRST CLAIM, INCLUDING A
DETERMINATION OF A COMPLEXITY
LEVEL OF THE FIRST CLAIM, TO
A CLAIMS SERVICE LEVEL
OBJECTIVE (SLO) MODEL ⟵ 930

PREDICTING HOW LONG
COMPLETION OF EACH STAGE IN
A PRE-DETERMINED PATH WILL
TAKE BASED ON THE COMPLEXITY
LEVEL OF THE FIRST CLAIM ⟵ 940

PRESENTING AN OVERVIEW OF THE
PRE-DETERMINED PATH SHOWING
THE PREDICTED DURATION FOR
EACH STAGE ⟵ 950

FIG. 9

SYSTEM AND METHOD FOR PROACTIVE CUSTOMER ENGAGEMENT EXPERIENCES

CROSS-REFERENCE TO RELATED APPLICATIONS

This application is a Divisional of, and claims benefit to, U.S. patent application Ser. No. 17/804,620 filed on May 31, 2022 and titled "System and Method for Proactive Customer Engagement Experiences"; the disclosure of which is incorporated by reference in its entirety for all purposes.

TECHNICAL FIELD

The present disclosure generally relates to a system and method of providing information to end-users, and more specifically to offering proactive and responsive information and guidance to a customer during customer service and support sessions.

BACKGROUND

Customer support and information centers, or call centers, are commonly set up by government agencies, organizations, and business operations to handle customer inquiries and to provide support for their products and services. For example, a customer support center may be a location with a few persons who handle incoming and outgoing customer calls. For larger organizations, the support center may be a dedicated facility with a large group of support personnel with advanced computers and telecommunication equipment, where the employees make calls and receive incoming customer inquiries. In some cases, a support center may handle customer calls concerning the repair or maintenance of their goods or services, or to otherwise interact with their customers. There are a wide range of applications that facilitate the activities of the support centers, including sales applications, such as order entry and reservation applications, financial services applications, including funds transfer and stock transactions, and customer service applications, including technical support, repair and claims handling.

However, while such remote communication and support centers are less expensive to operate, customers often describe such interactions as tedious and repetitive, and are generally rated lower in customer satisfaction. Customers typically are left 'out of the loop' with respect to the process associated with their issue, service, or product. The customer may make several attempts to follow up and determine what the next steps should be. Customers then find the process of explaining and re-explaining the details of their problem or question unnecessarily time-consuming and draining. Requiring customers to wait (on hold) or navigate repetitive and/or irrelevant steps in order to access real-time status updates becomes frustrating, and can deter customers from seeking help and/or from feeling satisfied with their products and/or service experience.

There is a need in the art for a system and method that addresses the shortcomings discussed above.

SUMMARY

In one aspect, a method for improving customer support experiences by proactive presentation of customer-specific information includes a first step of receiving, at a claim submission system and from an application accessed via a member computing device, a first input from a first policyholder of an insurance policy, and a second step of automatically creating and opening, in response to the first input and at the claim submission system, a first claim related to an incident associated with the first policyholder, where processing of the first claim follows a pre-determined path including a plurality of stages. The method also includes a third step of passing information about the first claim, including a determination of a complexity level of the first claim, to a claims service level objective (SLO) model, and a fourth step of predicting, via the claims SLO model, how long completion of each stage in the pre-determined path will take based on the complexity level of the first claim. Furthermore, the method includes a fifth step of presenting at a first time, via the application at the member computing device, an overview of the pre-determined path showing the predicted duration for each stage.

In another aspect, a method for improving customer support experiences by proactive presentation of customer-specific information includes a first step of receiving, at a claim submission system and from an application accessed via a member computing device, a first input from a first policyholder of an insurance policy, and a second step of automatically creating and opening, in response to the first input and at the claim submission system, a first claim related to an incident associated with the first policyholder, where processing of the first claim follows a pre-determined path including a plurality of stages. A third step includes passing information about the first claim to a claims complexity model, the information including a description of the incident, a loss type, and a number of people involved in the incident, and a fourth step includes determining, via the claims complexity model, the complexity level of the first claim using applying natural language processing (NLP) techniques to process the information. In addition, the method includes a fifth step of presenting at a first time, via the application at the member computing device, an overview of the pre-determined path showing a predicted duration for each stage based on the complexity level of the first claim.

In another aspect, a system for improving customer support experiences by proactive presentation of customer-specific information is disclosed. The system includes a processor and machine-readable media including instructions which, when executed by the processor, cause the processor to receive, at a claim submission system and from an application accessed via a member computing device, a first input from a first policyholder of an insurance policy, and to automatically create and open, in response to the first input and at the claim submission system, a first claim related to an incident associated with the first policyholder, wherein processing of the first claim follows a pre-determined path including a plurality of stages. The instructions further cause the processor to pass information about the first claim, including a determination of a complexity level of the first claim, to a claims service level objective (SLO) model, and then to predict, via the claims SLO model, how long completion of each stage in the pre-determined path will take based on the complexity level of the first claim. In addition, the instructions cause the processor to present at a first time, via the application at the member computing device, an overview of the pre-determined path showing the predicted duration for each stage.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 9 is a flow diagram of a process for improving customer support experiences by proactive presentation of customer-specific information, according to an embodiment.

DESCRIPTION OF EMBODIMENTS

Figure 1:
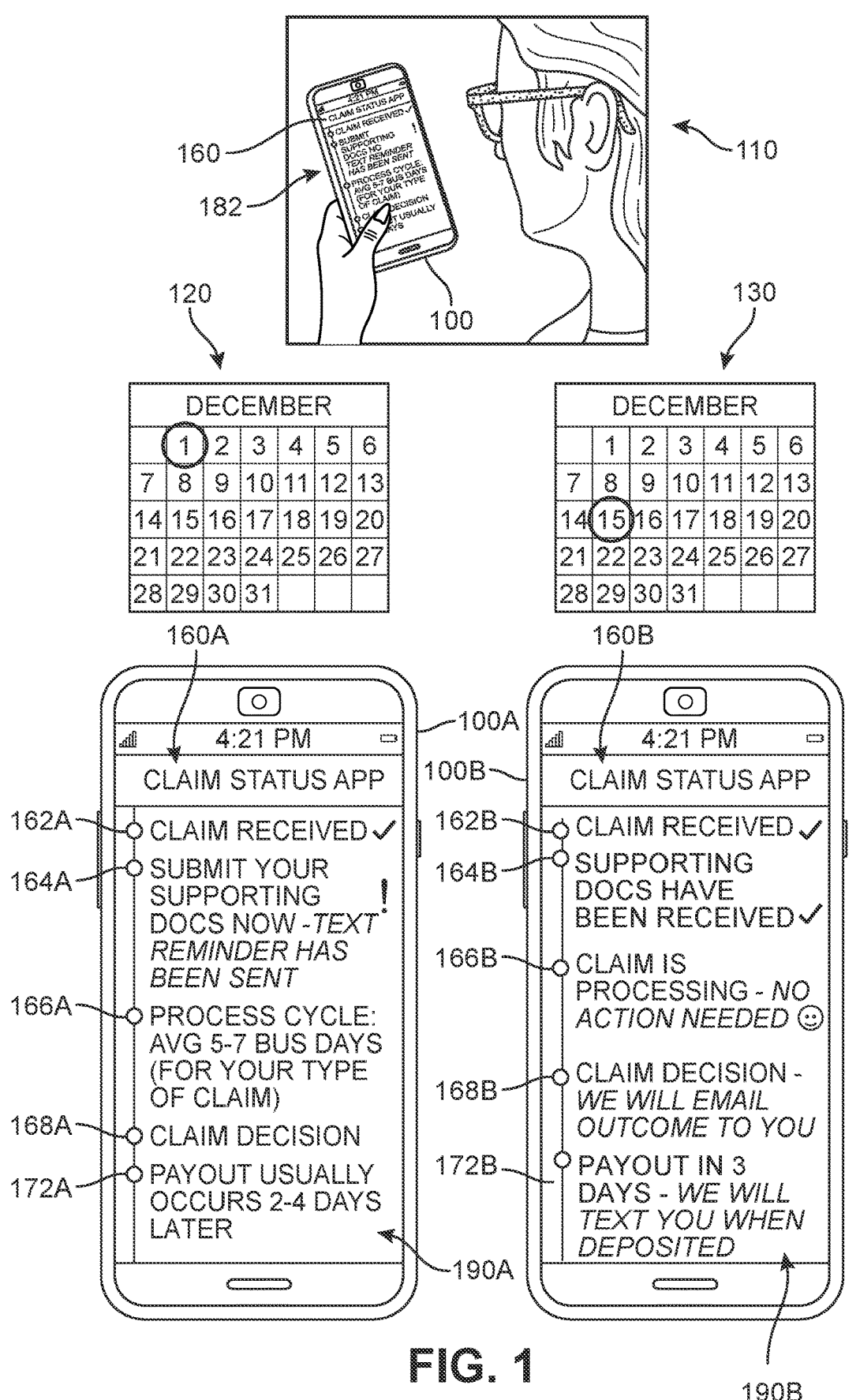
FIG. 1 is an illustration of an example of a user accessing an application on a first day and on a second day, and each day is associated with a different messaging presentation, according to an embodiment.

The embodiments provide a system and method for managing the exchange of information between a service provider and a customer by the use of artificial intelligence (AI) and machine learning (ML) techniques to proactively identify and present customer-specific task and status updates. Specifically, the embodiments provide a system and method for engaging customers by determining each individual customer's needs and, based on said needs, automatically generating intelligent and timely messaging and engagement options that are configured to proactively serve the customer's needs.

As a non-limiting example, customers who submit a claim to their insurer are often left in the dark regarding their claim's status, processing stage, and whether they are responsible for completing some task in order for the claim to be completed. As a result, most communications are driven by customers calling to learn the current status of their claim. In some cases, customers are driven by anxiety that they have failed to provide a required item or document, failed to perform or take some action related to their claim, or did not submit the correct information, which could lead to delays in their claim payout. Without a reliable up-to-date source of claim status and action items in any channel to notify and guide the customer of what stage of the claims process their claim has entered, and/or which action they need to take, there has remained a low level of customer satisfaction and increased calls, emails, chat requests, etc. into the insured's contact center.

The proposed embodiments facilitate the presentation of clear expectations and personalized and relevant information curated for each customer. The system offers each customer comprehensive and dynamic guidance that ensures information is offered to the customer per their selected channel and time intervals. More specifically, in different embodiments, the system generates and manages a predictive and proactive cadence of messaging to the customer in their channel of choice. This messaging sets clear expectations and guidance for the customer when an action needs to be taken on their part. As will be discussed in detail below, the cadence follows a segmentation framework based on the output of a series of ML models that will inform the service level objective (SLO) for the entire claims journey, improving the insurer's incident response or uptime (or other metrics).

As used herein, the term "customer" should be understood tor refer to any end-user or person requesting or receiving assistance or other communications from an entity such as a business or other organization. It should be understood that while the following description presents a sequence of examples illustrating the use of the proposed systems and methods in a customer-service provider dynamic, in other embodiments, the proposed systems may be utilized by a broad range of end-users, including team management and project guidance. For example, there are many occasions in which a student (or other end-user) is working on a project and needs guidance from a mentor, teacher, colleague, or supervisor. By making use of this type of system, the student can enable access to the overall project plan, as well as the status of each task and stage, enriching the communication experience for the student and facilitating their successful completion of the project.

In addition, as a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Referring now to FIG. 1, for purposes of introduction, a first user 110 accessing a first app 160 via a first device 100 is shown. As a general matter, the first device 100 can include an electronics unit comprising a plurality of different components, such as a user interface component (e.g., a touchscreen display, keyboard, mouse, speakers, etc.), a user interface module, a processor, and/or a communication module. For purposes of this example, first device 100 can be a desktop computer, laptop, tablet, or other computing device configured for connection to a network. Furthermore, the first device 160 includes one or more processors and memory. Memory may comprise a non-transitory computer readable medium. Instructions stored within memory may be executed by the one or more processors. A communication module may allow the first device 160 to communicate wirelessly. In different embodiments, the first device 160 may communicate with a mobile computing device, wireless devices, and/or with networked computers, for example over the internet. In this case, the communication module is a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In some embodiments, the first app 160 is available at least in part as a local resource stored on the first device 100, while in other embodiments, some or all features and modules of the system are made available via a remote cloud service or network. In FIG. 1, an optional authentication page 182 is presented to allow the first user 110 to access their account that is linked to the first app 160. For purposes of this example, the first app 160 provides various insurance services as part of an insurer service provider ("claim status app"). However, in other embodiments, the first app 160 can be any other type of application configured for recurring use by registered account members of the app.

In different embodiments, based on records of previous interactions of the user with the first app 160 (in-app activity) and communications of the first user 110 via other channels that are associated with the insurer, the first app 160 can be configured to present different information to the first user 110. In FIG. 1, the reference letter "A" indicates content associated with a first app layout (presented to the user on a first date), and the reference letter "B" indicates content associated with a second app layout (presented to the user on a second, subsequent date). In this case, it may be understood that over the past few days or more, first user 110 can engage in multiple access sessions with first app 160.

For example, if the first user 110 logs into the first app 160A on a first date 120, she is directed to a first status page 190A that includes first app content 170. In some embodiments, the first app 160A can present this information in its initial landing page, top page, welcome page, home page, or other initial app interface. In other embodiments, the first app 160A can receive a user selection requesting presentation of the claim status. As shown in FIG. 1, when first user 110 accesses the first app 160A on the first of the month (first date 120), she is able to verify that her recent claim submission has been successfully received by the insurer as a first stage 162A ("Claim has been received"). In addition, first user 110 is also shown the expected stages that are predicted to follow her claim, based on various factors, such as but not limited to claim type, coverage, location, etc., as will be discussed in more detail with reference to FIGS. 2 and 3 below.

In this example, the first status page 190A shows a second stage 164A ("Submit supporting documents now") that is highlighted or otherwise differentiated to indicate that this stage represents her claim's current status. In some embodiments, the second stage 164 is a selectable option that, when clicked or otherwise selected by the user, will redirect the user to an interface for managing and/or submitting the required documents. In addition, the second stage 164A includes a note ("Text reminder has been sent to your mobile") that is aligned with the user's own preferences for reminders and messaging from the insurer. More specifically, in this example, the first user 110 has asked to receive text-based messages that will expressly identify, following the completion of the prior stage, any task or communication that has been determined as the 'next step' of the claim submission process. In other embodiments, the user can request no messaging occur, or that these notifications be presented across one or more different channels (e.g., email, pop-ups, phone calls, etc.). The user can also define the intervals and/or frequency such messaging should occur. A third stage 166A ("Process cycle: average 5-7 business days for your type of claim") is also shown, allowing the first user 110 to see what lies ahead once she completes the second stage 164. In some embodiments, additional subsequent stage information may also be presented, such as a fourth stage 168A ("Claim decision") and a fifth stage 172A ("Payout (usually within 2-4 days)") that is based on claims similar to the claim currently at hand.

When the first user 110 logs into the first app 160B on a second date 130, it can be understood that during the interval between first date 120 and second date 130, she has provided the required documentation. Thus, on the second date 130, she is shown a second status page 190B that includes second app content 180 that differs from first app content 170 of first status page 190A. In this case, first stage 162B remains the same as in first app content 170. However, second stage 164B has been updated ("Supporting documents have been received!"), confirming that the task(s) needed for the second stage have been successfully completed. A third stage 166B ("Claim is processing") is now shown, and is highlighted or otherwise differentiated to indicate that this stage represents her claim's current status. In addition, the third stage 166B includes a note "No action needed" that reassures the customer that the current stage will be handled internally and that they need not worry that there is any pending task that might delay their claim decision.

Fourth stage 168B ("Claim decision") is again shown, allowing the first user 110 to see what lies ahead once the insurer completes the third stage 166B. However, as the user recently updated their notification preferences, an additional note is included ("We will email you outcome"). In some embodiments, additional subsequent stage information may also be presented. For example, fifth stage 172B ("Payout (usually within 2-4 days)") is again shown, but also modified by the user's recent preference update between the two dates ("We will text you when mailed").

Figure 2:
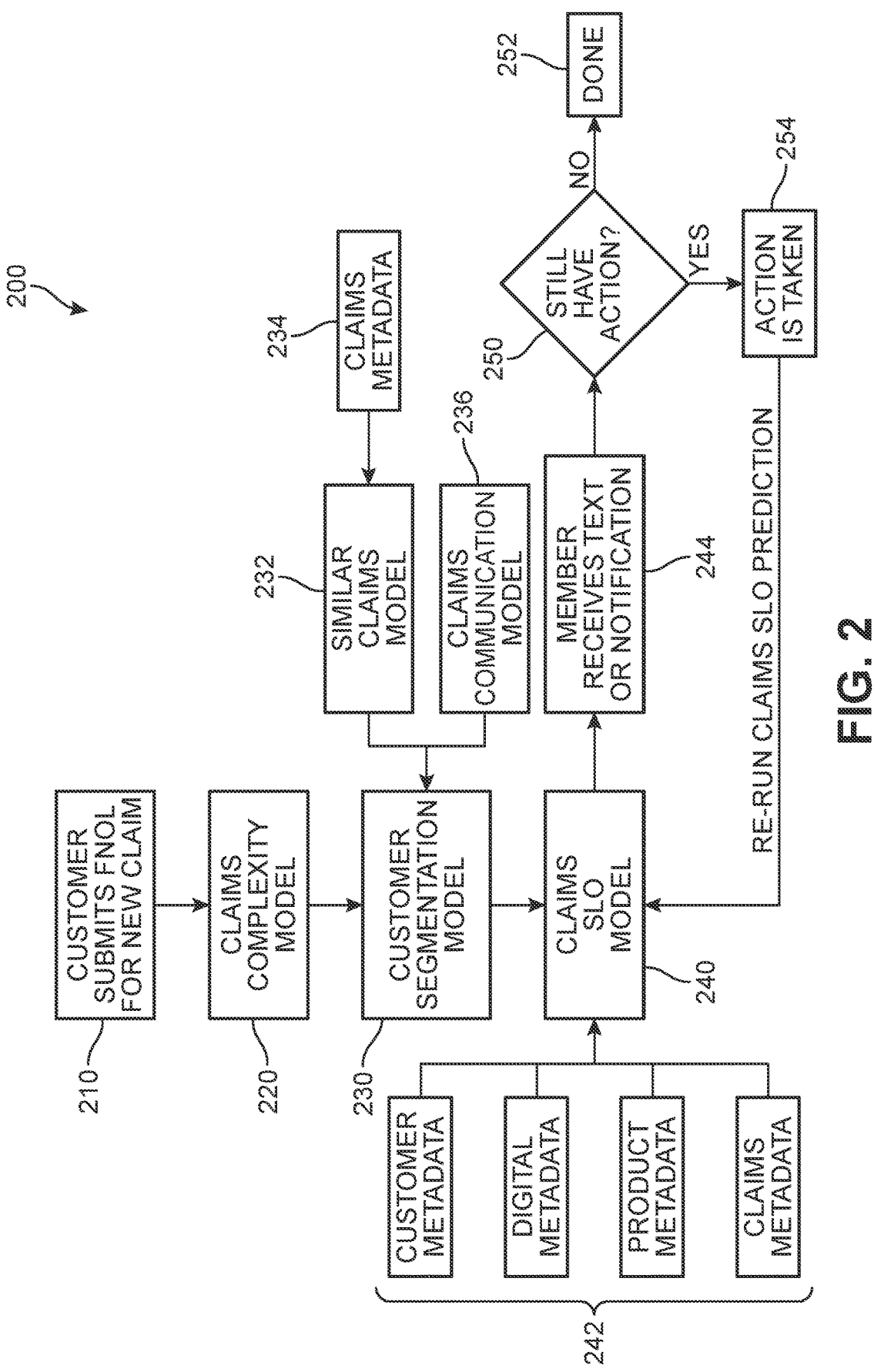
FIG. 2 is a schematic diagram of a system for automatically providing guidance to a policyholder using a sequence of AI models, according to an embodiment.

In order to provide the reader with a greater appreciation of the embodiments, FIG. 2 depicts an overview of an embodiment of an enhanced customer support environment ("environment") 200 in which a proactive customer engagement computing system ("system") tracks customer events and automatically generates proactive messaging and guidance tailored to the specific customer. As a general matter, environment 200 includes a customer computing device ("customer device") configured to communicate with an app or other facets of the insurer's system via, for example via a Wi-Fi, cellular, or other network connections. While the various components of environment 200 can be accessed from the app through a cloud network and/or stored on a cloud-based server in FIG. 2, in other embodiments some or all components described herein can be reside in customer device.

In different embodiments, a customer will provide an initial submission to the insurer, for example via their customer device. For example, the customer can initiate the creation of a new claim with a first notice of loss (FNOL), as per a submission event 210 in FIG. 2. The customer can do so over any channel, such as a phone call to the customer service center, an in person visit to a branch associated with the insurer, an email, an in-app submission using a software application ("app") that is associated with the provider of the product/service of interest to customer, etc. The details provided by the customer and/or associated with the customer's records are inputted to a claims complexity model 220. In different embodiments, the claims complexity model 220 determines the complexity of the claim by using natural language processing (NLP) on the loss description, loss type, and number of people involved.

The output of the claims complexity model 220 is received by a customer segmentation model 230. In different embodiments, the customer segmentation model 230 determines to which segment of customers the present customer should be assigned. This model works directly with two other models to output a value or segment. As shown in FIG. 2, the customer segmentation model 230 can make a determination based on outputs of a similar claims/customers model 232 and a claims communication model 236. The similar claims/customers model 232 is based on the customer's claim details, as well as the complexity of the claim and previous claims data from other customers that have submitted claims (e.g., "claims like yours" and/or "customers like you"), for example with reference to claims metadata 234 for previous claims stored in the system. The claims communication model 236 is based on whether the customer has opted in to receive notifications, updates, and other communications regarding their claim, which channel they wish to receive communication in at each stage of the claims process, and how often.

The output of the customer segmentation model 230 is then received by a claims service level objective (SLO) model 240, which is configured to directly manage communications and expectations with the customer. The claims SLO model 240 is a time series model that predicts how long each phase of the current claim is most likely to be completed. The claims SLO model 240 receives contextual metadata 242 (such as customer metadata, digital metadata, product metadata, and claims metadata), determines how each of the various stages of the customer's claim are most likely to occur, and causes the generation of a notification or other information presentation to the customer (see SLO output 244) per the customer's preferences. In a decision 250, the system determines if there are actions remaining (i.e., in the performance of the stages of the claims processing); if no actions remain, the process is now complete at a final stage 250. If action(s) remain, the system can engage in the next action 254 appropriate or scheduled. In response, the claims SLO model 240 will re-run its prediction in a review stage 256. This cycle can be repeated until all actions to be performed—along with the selected messaging to the customer—have been performed. In other words, as the customer or an employee or system completes a step within the process, a trigger occurs to rerun the SLO model and refresh the time prediction. When executed as described herein, the AI/ML system is configured to anticipate the customer's need and engage the customer proactively before the customer feels the need to contact the insurer regarding their claim.

Furthermore, it can be appreciated that in different embodiments, the system uses machine learning techniques to learn individual customer preferences. In other words, even if a customer does not expressly state or select their preferences, the system can apply local, edge-computing based machine learning algorithm that will observe the member's behavior and preferences while the customer uses the insurer app. Over time, the local ML system learns the member's preferences. This local ML model is then used to customize the flow of information and the customer engagement profile for this particular customer. For example, in some cases, customers may want little to no information or updates, just a message when their car has been repaired and ready for pick up. In other cases, customers may want up-to-the minute status information about their claim and the status of repairs to their vehicle. In these cases, the ML system can create animations on the customer's local app that provide details of the claim and the vehicle repairs. In some embodiments, these updates and other messaging can be conveyed via text, images, or animation that is tailored for the customer. In addition to animations, the ML system can also produce text messages, voice mails, or any other form of communication desired by the member, and at a frequency or timing desired by the member.

Although not shown in FIG. 2, it should be understood that a support agent (human or virtual) can be connected to and interact with customers in person, over a video service or telephone, and/or via a call management or customer support server that can manage the distribution, transfer, and handling of various calls that come into the support center in order to perform some aspects of the claim submission and review process. For example, a customer may be routed via the customer support server to an appropriate agent computing device associated with a particular member service representative (MSR) to respond to the particular caller. In different embodiments, the agent can be connected to or include an internet customer interface for providing support specifically to customers or members who contact them via the Internet. As a general matter, a support agent can refer to any person or personnel who offers the caller (or person who was called) assistance, and has access to the claims processing system during the communication session with the customer. The support agent will record the customer's interactions and outcome of their support session in a way that will enable the system to determine whether an additional stage—or portion thereof—has been completed, in order to update the claim SLO model's prediction(s).

As noted earlier, in different embodiments, the customer may alternatively or additionally, complete some aspect of the claim processing via an insurer app. The app can represent an interactive platform that provides a site from which the customer can create and maintain an account, access information and options related to the insurer (or other service provider) and its products or services, review and/or modify their account details, and/or communicate with personnel. For example, the customer can enter various inputs via their customer device that are received by an input processor of the app. In some embodiments, the app will generate a log of these inputs and selections via a customer activity tracker ("tracker"). In other embodiments, the tracker may be a component that is external to app. The tracker can, in some embodiments, be in communication with a customer database that will store the information as a short or long-term record associated with the customer's account. In some embodiments, the tracker can be configured to automatically transfer the data in real or near real-time to the customer database, upon the completion of a specific task by the customer, and/or in response to the customer's interaction with a support agent. For example, during or after an in-app session by a customer, a reporting system can be configured to automatically generate a summary of the customer's most recent in-app activity and/or in-app activity that has been logged as being related to the claims processing tasks or actions.

For purposes of clarity, a generic case of an implementation of the environment 200 is now provided. In this example, a customer has just submitted their claim (i.e., submission event 210) and, per the standard claim processing paradigm, needs to set up time with an adjuster. Once the customer's details have been received and the sequence of models (i.e., claims complexity model 220, customer segmentation model 230, similar claims/customers model 232, claims communication model 236, and claims SLO model 240) have been run, the customer will receive an automated notification from the system. A non-limiting example notification can be based on a template as follows:

"Thanks for submitting your claim, {firstName}. We're ready for you to {nextActionDescription}. It typically takes {number} days once the request is made. Would you like to {nextAction} now?"
Where:
{firstName}=customer name on claim
{nextActionDescription}=description of next action (e.g., schedule time with an adjuster to review damages)
{number}=predicted SLO for next action
{nextAction}=the type of action (e.g., schedule)

Figure 3:
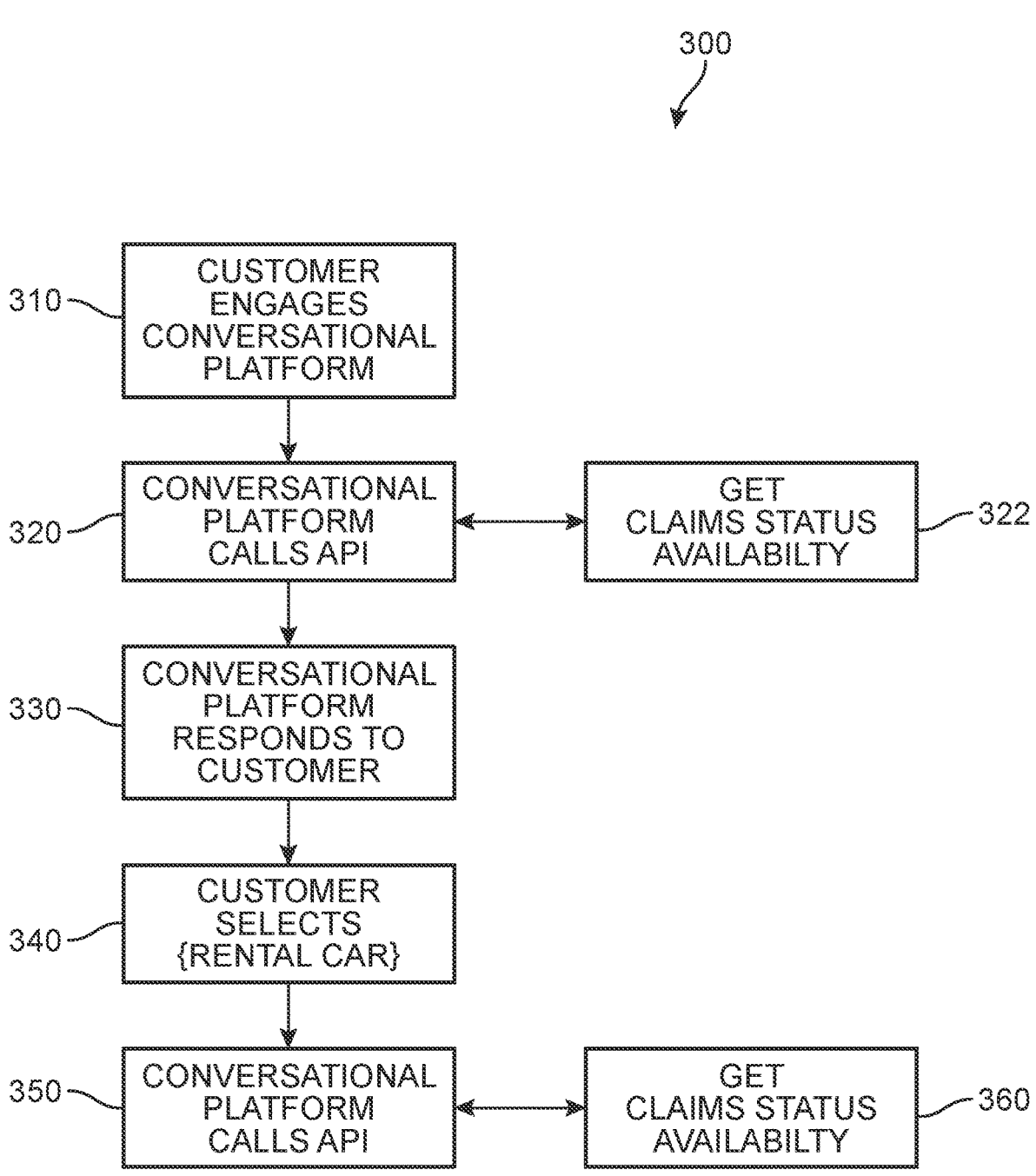
FIG. 3 is a flow diagram showing a process by which claims status is updated and presented to an end-user, according to an embodiment.

A more detailed example of this process is shown in customer engagement flow diagram 300 of FIG. 3. As shown in FIG. 3, a customer can engage with a conversational platform (i.e., a communication channel such as an app, website, phone call) in a first step 310. In response, the selected conversational platform calls an API in a second step 320 that will retrieve information 322 available about or regarding the claim's status. For example, following a meeting with the adjuster, the system can automatically generate and present the following message to the customer via their preferred channel:

"Thanks for meeting with the adjuster. We're now ready to get you a rental car. It typically takes 1 day to confirm your rental. Would you like to confirm a rental car now?"<DIRECT LINK>

Where the <DIRECT LINK> represents a selectable option that can trigger presentation of a menu, experience, or interface through which the customer rental cars can be reserved.

In different embodiments, the engagement experience is also informed based on status of the claim if a customer does not wait for proactive communication and engages USAA in a digital or phone channel. A claims status API will incorporate business logic using customer claim and policy data to inform a conversational platform (e.g., interactive voice response (IVR), Search, Voice, Chat) or digital experience of what status is appropriate to display to the customer and what action needs to be taken next.

For example, referring to FIG. 3, a customer may be inquiring about the status of their claim with a chatbot at the first step 310. The chatbot calls into the claim's status API for its current status (second step 320) and is provided with an active status only for each part of the claim. In different embodiments, these status conditions can include claim-related tasks such as providing the customer with a rental car, conducting an estimate of the damage and repair costs associated with the submitted claim, performing an inspection of the insured property, determining a payment, etc. The API response informs the chatbot of which response to provide based on policy and claims data. The chatbot response is dictated based on how the data is returned. In a more specific example, following the completion of a first action (e.g., meeting with an adjuster), the system can run a script with output such as:

Rental Car
{
statusAvailable: true
}

Thus, the system will produce a response that is dynamic based on availability of a specific feature or benefit associated with the customer's claim. In this particular example, the active status is determined to be available for two stages, including rental car and inspection. In this case, the system can generate a dynamic response in a third step 330 (conversational platform responds to customer) such as:

I see you have an active auto claim. Do you have a question about a {rental car} or {inspection}?

In different embodiments, the customer may make a selection in a fourth step 340. The conversational platform will again call the API in a fifth step 350 to retrieve a claim status 360 regarding the customer's selection (rental car). Continuing with this example, if a rental car is the status a customer wishes to engage, there could be three scenarios: (1) customer had no rental car coverage at time of loss; (2) customer had rental car coverage at time of loss but has not scheduled a rental; and (3) customer had rental car coverage at time of loss and has already scheduled the rental. Based on the true or false Boolean responses and data that is present, the API informs the chatbot on how it should respond to the customer. For example, following the customer selection, the API can run a script with output such as:

Rental Car
{
statusAvailable: true
scheduled: true
hasCoverage: true
location: addresshere
}

Thus, the system will produce a response that is dynamic based on the scenario associated with the current stage of the customer's claim, including a {no coverage} response, a {has coverage, but needs to schedule}response, and a {scheduled with location details} response. In this particular example, the rental car is identified as having been scheduled, the customer has rental coverage, and their car is scheduled at a given location. In this case, the system can generate a dynamic response (conversational platform responds to customer) such as:

I see you have rental coverage. Do you have a question about your {coverage} or {scheduled rental}?

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors. In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 4:
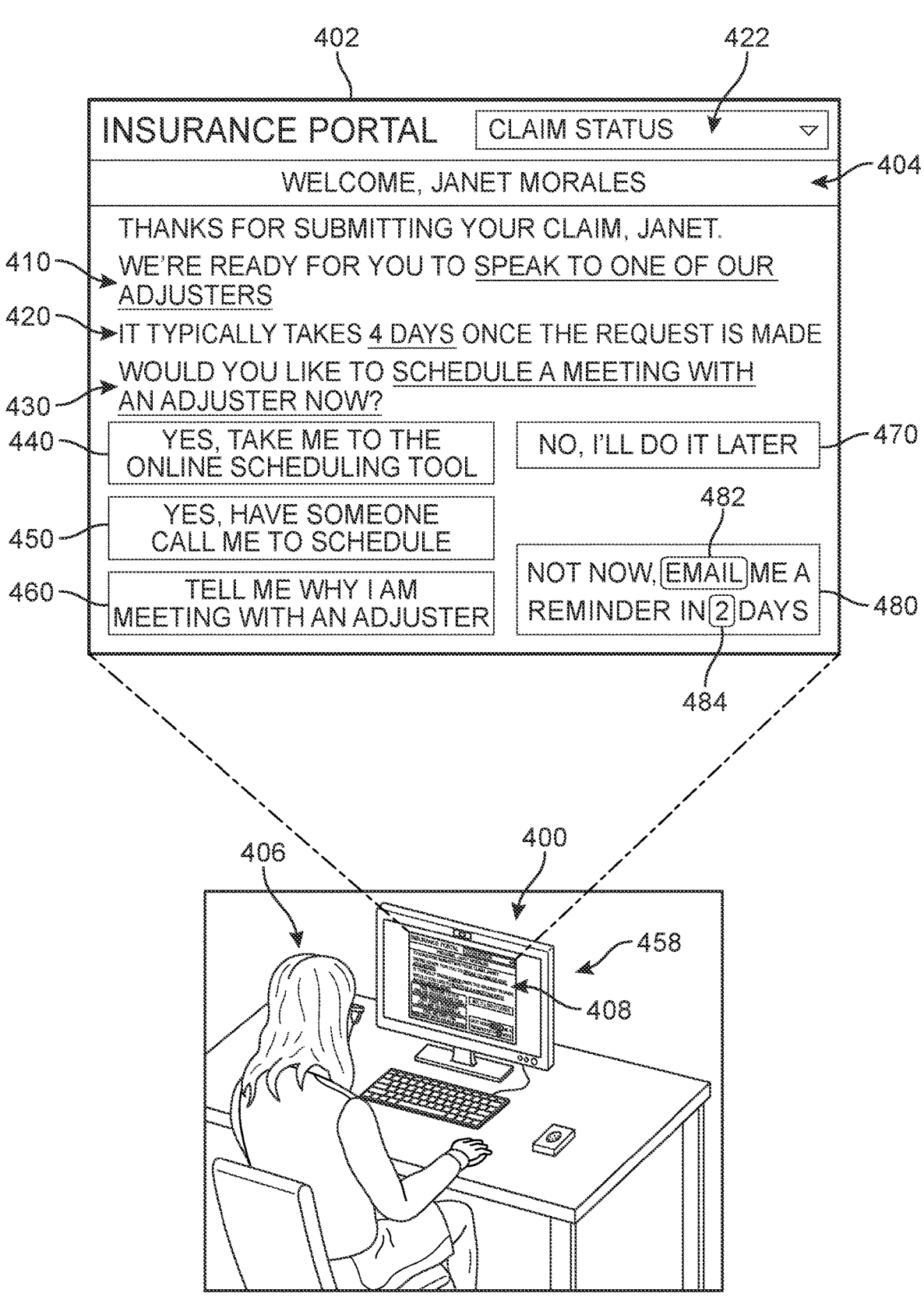
FIG. 4 is a depiction of a policyholder submitting a first notice of loss and causing a claim to be generated, according to an embodiment.
Figure 5A:
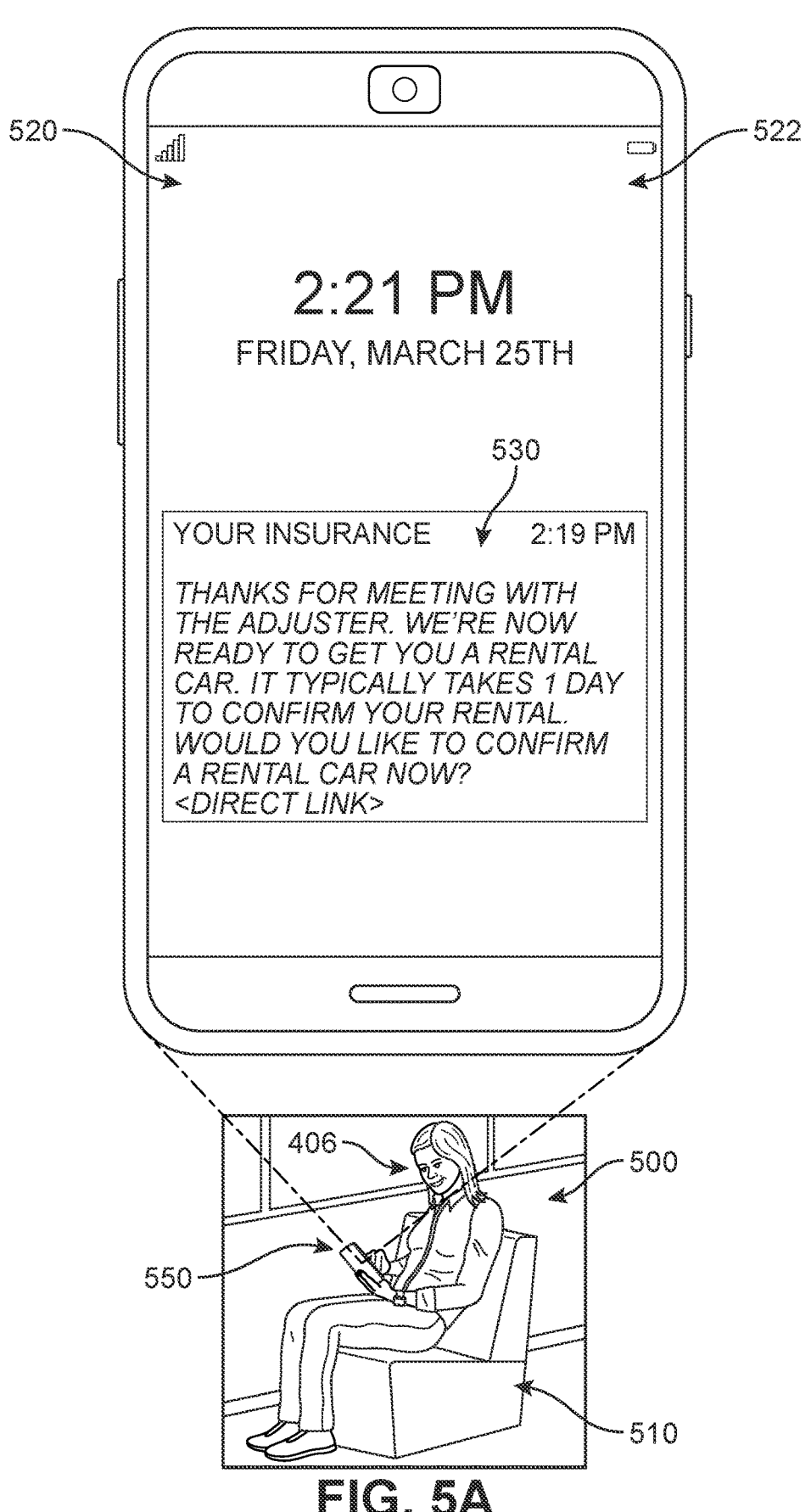
FIGS. 5A, 5B, and 6 are depictions of the policyholder receiving notifications regarding their claim via text messages, according to an embodiment.
Figure 5B:
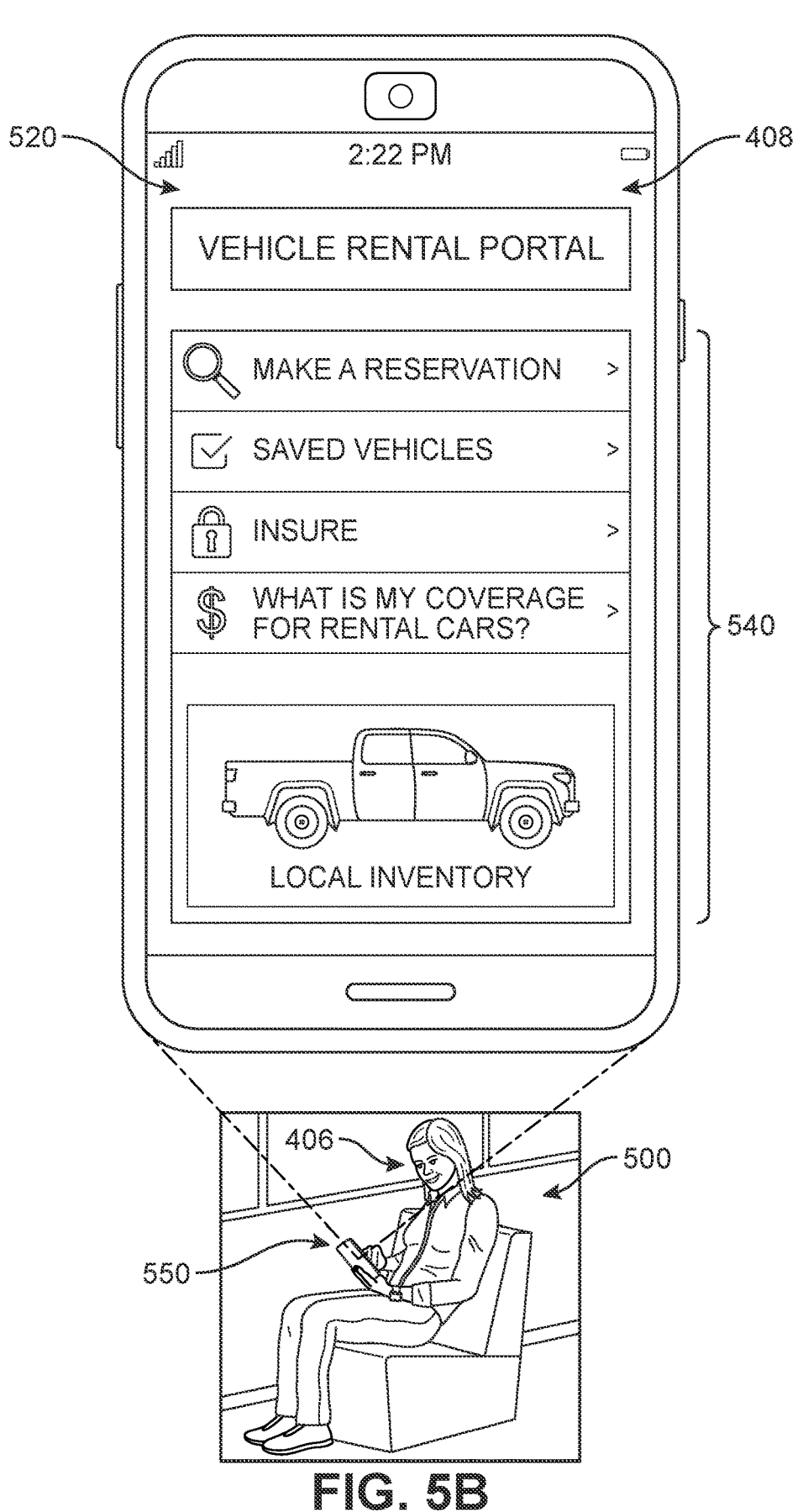

Referring now to FIGS. 4-8, a sequence of drawings illustrates one example of a use of a proactive customer support system ("system"). In FIG. 4, a second user 406 is depicted at a first time 400 at her office using a desktop computer 458 to access a software application ("app") 408 associated with her insurer. In FIG. 4, the second user 406 is shown interacting with a first content of a user interface 402 of app 408. The second user 406 has logged into his account, as indicated by an account header 404 ("Welcome, Janet Morales"). During this current app usage session, second user 406 has navigated from a main page to a Claim Status page, as indicated by a navigation header 422. In order for the app to determine what information should be offered to the second user 406, the system will execute the sequence of models described earlier with respect to FIG. 2 and implement the process presented in FIG. 3. In this example, the app 408 initially confirms that the claim has been submitted ("Thanks for submitting your claim, Janet"). The system will process the first user's information and metadata via the claims complexity model, which will determine the stages and/or scope of her claim. In this example, the app 408 determines that the next stage involves a meeting with an adjuster, and a first message 410 ("We're ready for you to speak to one of our adjusters") is shown. The conversational platform for the app 408 then again calls the API for claim status availability and determines a meeting with an adjuster usually occurs within four days of the meeting request, as represented by a second message 420 ("It typically takes 4 days once the request is made").

As noted earlier, each response is dynamic based on the current customer scenario. In this case, the app 408 further offers an interactive content 430 ("Would you like to schedule a meeting with an adjuster now?") by which the first user can expedite the next step. In addition, the system determines, based on the outputs of the customer segmentation model and the claims SLO model, what the expected timeline of processing for the claim will be. In this example, based on other customers like second user 406 and metadata for the second user 406, as well as the output of the claims communication model that indicated in-app messaging is desirable for the second user 406, the app 408 presents a plurality of selectable options the second user 406. For purposes of illustration, in different embodiments, these options can include a first option 440 ("Yes, take me to the online scheduling tool") that facilitates the direct scheduling over the web portal, a second option 450 ("Yes, have someone call me to schedule") in case the second user 406 prefers to have human interaction, a third option 460 ("Tell me why I am meeting with an adjuster") in case the second user 406 wants to learn more about the next stage before proceeding, a fourth option 470 ("No, I'll do it later") in case the second user 406 is not ready to proceed with this action/task, and a fifth option 480 ("Not now, email me a reminder in 2 days") in case the second user 406 wishes to postpone the action. In some embodiments, the app 408 can be configured for flexibility with respect to each option. As a non-limiting example, the fifth option 480 includes selectable modifiable elements, whereby the second user 406 can select a different communication channel 482 and/or a different period of time 484 before selecting the function offered by the fifth option 480.

In other embodiments, the app 408 can present further or alternate options for enabling the user to further engage with the claim process, describe any problem, question, concern, etc. In some embodiments, the user may request additional details about the product/service (for example, the premiums paid, dates and details of previous claim submissions, coverage offered by their current insurance condition of item at the time of purchase, etc.), documents that have been submitted or created related to the claim, product information (for example, about the covered item, model or serial number, dimensions, warranty information, etc.) as well as other kinds of information regarding the product/service or user himself/herself that might be pertinent to resolution of the claim.

As noted earlier, as the customer moves through the various actions associated with each stage of the claims processing process, embodiments of the proposed systems can 'follow' the customer's journey and preemptively connect the customer from one stage or action item to the next. This intelligent customer engagement approach is depicted in the continuing example of FIGS. 5A and 5B. The second user 406 is shown seated on a bus 510 with a mobile phone device ("phone") 550 at a second time 500 subsequent to the first time 400 of FIG. 4. It can be understood at this time that the second user 406 has completed the action item in which a meeting with an adjuster was required. At this time, she receives a text notification 530, as presented on a lock screen 520 of display 522 of phone 550. The text notification 530 ("Thanks for meeting with the adjuster. We're now ready to get you a rental car. It typically takes 1 day to confirm your rental. Would you like to confirm a rental now?<DIRECT LINK>") is an automatically generated message from the insurer's proactive customer engagement computing system that represents a proactive communication relevant to the claim submitted by second user 406. In this case, the message summarizes the claim's status by confirming the completion of the adjuster meeting task, and describing the next step available for the customer.

In different embodiments, the text notification 530 is generated based on the user's own preferences regarding each stage of the process. This selection may have been made earlier in-app, via their online web portal account, or in a conversation with a service agent. For example, for purposes of FIG. 5A, the second user 406 requested that she should receive a text message whenever the adjuster had concluded their report. In some embodiments, the message can include an expedited navigation link to route the customer directly to the content or channel by which the next action might be performed or initiated. In this case, when the second user 406 clicks on the link, app 408 is automatically opened on phone 550 with rental car content options 540 displayed. As some non-limiting examples, the rental car content options 540 include a first option to make a rental car reservation, to view the user's saved vehicles, to access the user's vehicle reservations, to learn more about their rental car coverage, and to view the local inventory of rental cars.

Figure 6:
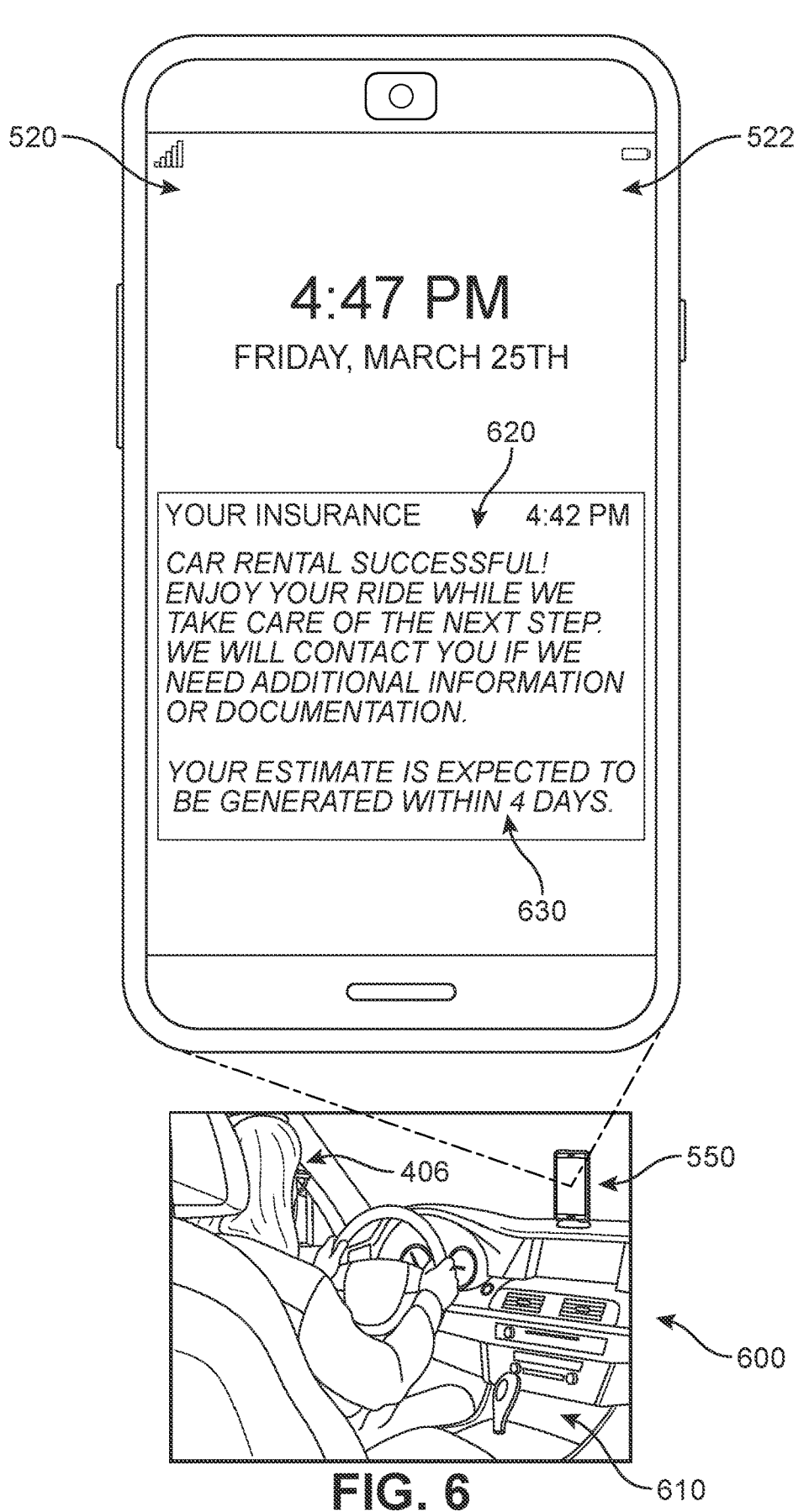

Once the second user 406 completes their reservation, they can proceed with picking up their rental, as depicted in FIG. 6. At a third time 600 subsequent to second time 500 of FIG. 5A, the second user 406 is depicted in their rental car 610. Phone 550 is positioned on a dashboard of the rental car 610. Per the second user's preferences requesting additional text-based notifications related to the rental car process, a confirmation message 620 ("Car rental successful! Enjoy your ride while we take care of the next step. We will contact you if we need additional information or documentation. Your estimate is expected to be generated within 4 days") may be generated and shown on the lock screen 520. In this example, the system confirms the current status of the claim, and reassures the second user 406 that no further action is needed on their part for the time being. This is typically a concern of customers, who wish to be sure that there is no outstanding task they should be completing that might cause a delay in the processing of their claim. Furthermore, the system has determined an expected turnaround time for the next stage (estimate) based on similar claims, which is presented to the customer. In different embodiments, if there are delays relative to the time that was originally given, the system can continue to proactively update the customer in real-time so they remain abreast of the delay and reasons. This engagement can significantly reduce the number of calls into the customer service center, as customers remain "in the loop" and can be immediately updated whenever there is new information regarding their claim status.

Figure 7A:
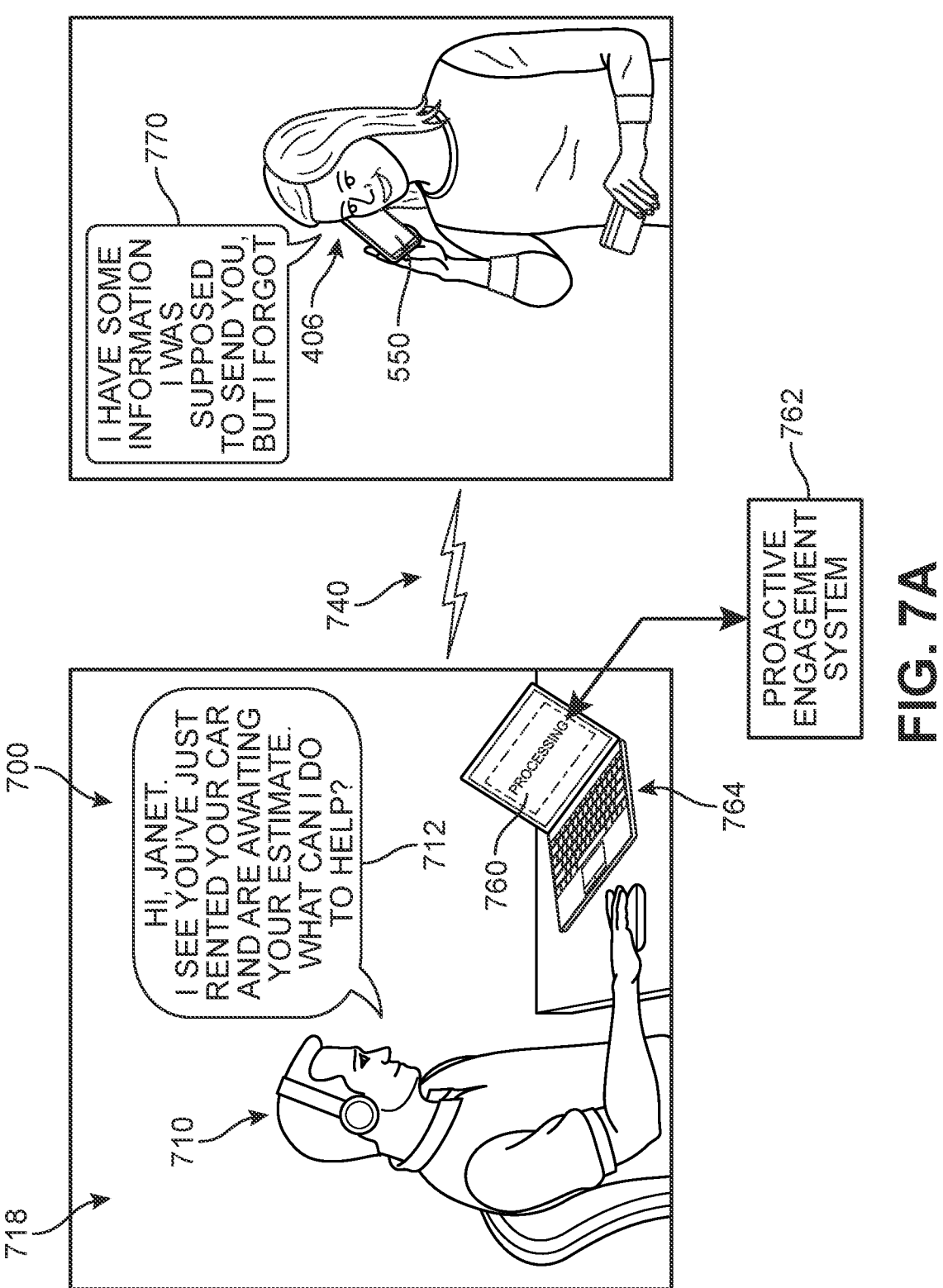
FIGS. 7A and 7B are an illustration of the policyholder speaking to a support agent for her insurer and performing a task associated with her claims process, and thereby updating her claim status, according to an embodiment.
Figure 7B:
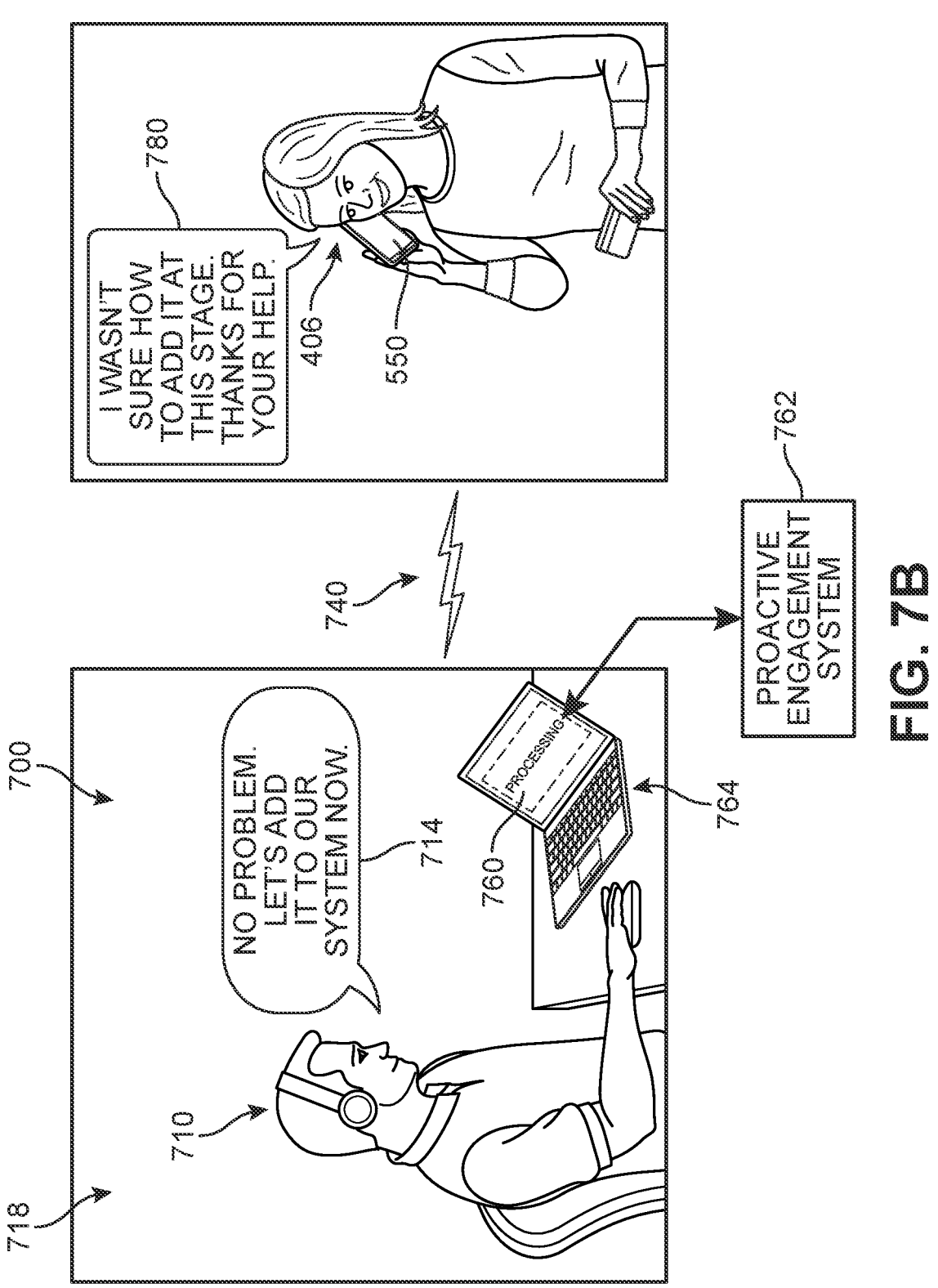

Referring now to FIGS. 7A and 7B, in different embodiments, it can be appreciated that there may be scenarios where the customer nevertheless reaches out to the service provider (e.g., insurer) to discuss their claim, outside of the standard stages or proactive engagement sessions. In FIG. 7A, at a fourth time 700 subsequent to third time 600 of FIG. 6, the second user 406 initiates a phone call over phone 550 to a (remote) customer service center 718. A service representative/agent 710 for the insurer takes the call and accesses the customer's account. In some embodiments, proactive customer engagement system 762, accessed here via an agent computing device 764, can be configured to generate a customer activity report ("report") 760 for second user 406 based on the customer's activity history, claim status, and the metadata for their account. In this example, the report 760 includes the customer account name, and a time reference (e.g., "Today, 17 minutes ago") indicating how long ago the most recent activity occurred (e.g., "Customer picked up rental car"). The report 760 can further include an overview of the customer's claim (e.g., "Customer filed claim 18 days ago for damage to her vehicle following hit and run. Claim status is in estimate stage"). In some embodiments, the report 760 can also include information or past activity for the customer from earlier points in time, particularly those determined to be related to the current claim (e.g., "Two weeks ago: customer called to explain why their claim is urgent and should be expedited"). Thus, the system allows the agent to quickly apprise themselves about the claim's status and the customer's likely needs and easily familiarize himself with the background context for the call by reviewing report 760. In addition, the report 760 can remain on his screen while he communicates with second user 406.

Thus, as shown in FIG. 7A, as soon as the connection (e.g., via network 740) with second user 406 and agent 710 is initiated, rather than beginning by reciting a series of questions about the customer's claim, the agent 710 is able to represent a continuation of the customer's engagement with the system. In other words, from the customer's point of view, the support experience comprises a substantially single event session, flowing easily between the in-app actions, messaging, and the subsequent call with the agent, rather than discrete event sessions in which the customer must engage in repetitive interactions.

In FIG. 7A, the agent 710 responds to the call with the second user 406 by quickly summarizing their understanding of the customer's scenario 712 ("Hi Janet. I see you've just rented your car and are awaiting your estimate. What can I do to help?"), customizing the experience for the user without requiring the customer to explain the context for the call. In other embodiments, there may be some other introductory remarks, or the second user 406 may immediately launch into their reasons for calling, but essentially the representative is able to appreciate the customer's concerns without hesitation or circuitous remarks or questions, while the customer experiences the peace of mind of a minimal hassle and expeditious support experience.

In this example, a first statement 770 ("I have some information I was supposed to send you but I forgot") by the second user 406 explains that there is extra information or detail or documentation that was optional but is available. For example, there may be additional video footage or images that were located of the scene by a passing witness, and given to the second user 406, but she had forgotten to include those in her submission, or the contact information for a witness. In FIG. 7B, the agent 710 responds ("No problem. Let's add it to our system now"). The second user 406 can be understood to provide the new information, and is able to conclude the call with second statement 780 ("I wasn't sure how to add it at this stage. Thanks for your help"). Although the call was between two human persons, it can be understood that a record of this interaction will be recorded by the proactive customer engagement system 762. In response, the system will update its claim status information for the second user 406. In other words, the status will be updated by the system regardless of the communication channel used to complete the action item or provide the information.

Figure 8:
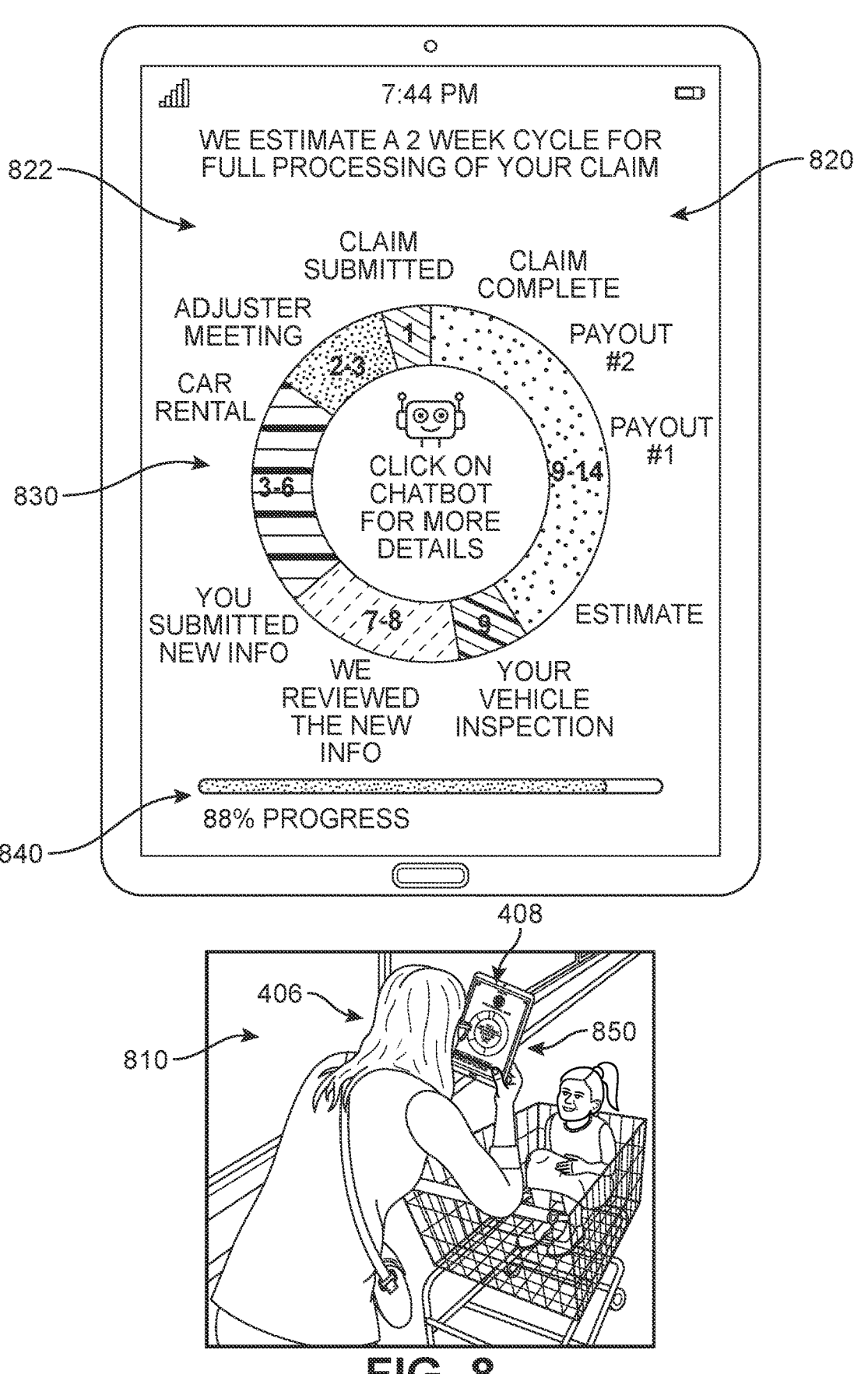
FIG. 8 is an illustration of the policyholder reviewing an updated claims processing graphical summary via a computing device, according to an embodiment.

An example of this integration of information from multiple sources is presented in FIG. 8. Second user 406 is shown shopping at a retail location 810 at a fifth time 800 subsequent to fourth time 700 of FIG. 7A. Second user 406 opens the app 408 on a tablet computing device ("tablet") 850 and accesses a claim status interface 820 shown on a touchscreen display 820 of tablet 850. The claim status interface 820 includes a claim summary 830 in a first visual, animated, or graphical representation. In this specific example, the claim summary 830 is presented as a progress pie or circle chart. The chart is segmented into a plurality of portions, each portion corresponding to a specific event or stage associated with the claim. The chart shown in FIG. 8 is for illustration purposes only, and it should be understood that any other type of animation can be used to represent the claim status or show an overview. In different embodiments, the customer themselves can select the type of graphic or animation that should be employed by the system in presenting their claim status summary or other details related to their claim. In some embodiments, a simple progress bar 840 is also displayed to quickly show the customer their claim journey status.

In this specific example, each segmented portion of the circle chart represents a separate stage, phase, action, task, or event associated with the claims process. In some embodiments, the size of each segment is based on the number of days/duration that the phase is estimated (by the system) to require, or how long it actually took if it has already occurred. In FIG. 8, these segments include (a) claim submission, (b) adjuster meeting, (c) car rental, with a custom note indicating new information was also submitted during this time frame (e.g., as shown in FIGS. 7A and 7B), an updated, new segment (d) in which the new information was reviewed, (e) the vehicle inspection, (f) final processing and estimate, (g) payout(s), and (h) claim processing completion. In some embodiments, each of these segments can be associated with a link that if selected can redirect to a new page, or create a 'pop-up' window, that will present additional details regarding that particular event. In other embodiments, the same or similar type of information can be presented as an animation, in which each stage or action is interactable and/or offers more simplified or attractive guidance for the user, based on their preferences or past use.

FIG. 9 is a flow chart illustrating an embodiment of a method 900 for improving customer support experiences by proactive presentation of customer-specific information. The method 900 includes a first step 910 of receiving, at a claim submission system and from an application accessed via a member computing device, a first input from a first policyholder of an insurance policy, and a second step 920 of automatically creating and opening, in response to the first input and at the claim submission system, a first claim related to an incident associated with the first policyholder, where processing of the first claim follows a pre-determined path including a plurality of stages. The method 900 also includes a third step 930 of passing information about the first claim, including a determination of a complexity level of the first claim, to a claims service level objective (SLO) model, and a fourth step 940 of predicting, via the claims SLO model, how long completion of each stage in the pre-determined path will take based on the complexity level of the first claim. Furthermore, the method 900 includes a fifth step 950 of presenting at a first time, via the application at the member computing device, a graphical or other visual overview/dashboard of the pre-determined path showing the predicted duration for each stage.

In other embodiments, the method may include additional steps or aspects. In one embodiment, the overview further includes status data indicating whether task(s) associated with a given stage are pending or have been completed. In some embodiments, the method also includes steps of receiving, at the claim submission system, a second input from the first policyholder, determining the second input corresponds to execution of a first task for a first stage of the pre-determined path, and automatically updating, at a second time, the overview to indicate the first task has been completed. In another example, the method also includes steps of receiving, at the claim submission system, a second input from the first policyholder, determining the second input corresponds to completion of a first task for a first stage of the pre-determined path, automatically generating, at a second time, a message indicating the first task has been completed, identifying a communication channel based on preferences previously selected by the first policyholder for conveying alerts related to the first task, and transmitting the message to the first policyholder via their preferred communication channel.

In some embodiments, the determination of the complexity level of the first claim further comprises steps of passing information about the first claim to a claims complexity model, the information including a description of the incident, a loss type, and a number of people involved in the incident, and then determining, via the claims complexity model, the complexity level of the first claim using applying natural language processing (NLP) techniques to process the information. In one example, the method also includes identifying, via a similar claims model and based on the complexity level and previous claims data from other policyholders that have submitted claims, one or more prior claims that have a high likelihood of representing a claim scenario similar to that represented by the first claim. These similar prior claims can be used by the models to determine how long the current customer/policyholder's claim should take, as well as likely communication channel preferences (if the user has not previously specified their own).

In some embodiments, the method also includes determining, via a claims communication model, whether the first policyholder has opted in to receive notifications regarding the first claim, which channel they wish to receive messaging for each stage, and how often they wish to receive messaging. In one example, predicting how long completion of each stage will take further includes steps of passing information about the first claim and output of the similar claims model to a policyholder segmentation model, and identifying a first segment of other policyholders who have similar communication preferences as the first policyholder. In some embodiments, predicting how long completion of each stage will take is further based on policyholder metadata, claims metadata, insurance product metadata, and digital use metadata for the first policyholder. In another embodiment, the method includes steps of receiving, at the claim submission system, a second input from the first policyholder, determining the second input corresponds to execution of a first task for a first stage of the pre-determined path, and that all tasks for the first stage are now complete, and updating, via the claims SLO model, how long completion of stages subsequent to the first stage in the pre-determined path will take based on metadata associated with tasks of the completed first stage.

Other methods can also be contemplated within the scope of this disclosure. For example, a method for improving customer support experiences by proactive presentation of customer-specific information includes a first step of receiving, at a claim submission system and from an application accessed via a member computing device, a first input from a first policyholder of an insurance policy, and a second step of automatically creating and opening, in response to the first input and at the claim submission system, a first claim related to an incident associated with the first policyholder, where processing of the first claim follows a pre-determined path including a plurality of stages. A third step includes passing information about the first claim to a claims complexity model, the information including a description of the incident, a loss type, and a number of people involved in the incident, and a fourth step includes determining, via the claims complexity model, the complexity level of the first claim using applying natural language processing (NLP) techniques to process the information. In addition, the method includes a fifth step of presenting at a first time, via the application at the member computing device, a graphical or other visual overview of the pre-determined path showing a predicted duration for each stage based on the complexity level of the first claim.

In other embodiments, this method may include additional steps or aspects. In one embodiment, the overview further includes status data indicating whether task(s) associated with a given stage are pending or have been completed. In another embodiment, the method also includes steps of receiving, at the claim submission system, a second input from the first policyholder, determining the second input corresponds to completion of a first task for a first stage of the pre-determined path, automatically generating, at a second time, a message indicating the first task has been completed, identifying a communication channel based on preferences previously selected by the first policyholder for conveying alerts related to the first task, and transmitting the message to the first policyholder via their preferred communication channel.

As described herein, the proposed systems are configured to retrieve multiple types of data in order to holistically inform a single customized experience that is seamless and connected for customers. The system offers a proactive mechanism that promotes digital adoption and increases digital self-service for customers. The proposed approach further optimizes spend and also reduces costs related to customer service contact centers. By generating unique notifications that are presented in the customer's preferred communication channel (e.g., texting, automated calls, email, etc. occurring on a local handset device) each customer will have a personalized and supportive customer support experience.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for improving customer support experiences by proactive presentation of customer-specific information, the method comprising:

receiving, at a claim submission system and from an application accessed via a computing device associated with a first policy holder of an insurance policy, a first input from the first policyholder;

automatically creating and opening, in response to the first input and at the claim submission system, a first claim related to an incident associated with the first policyholder, wherein processing of the first claim follows a pre-determined path including a plurality of stages;

passing information about the first claim to a claims complexity model, the information including a description of the incident, a loss type, and a number of people involved in the incident;

determining, via the claims complexity model, the complexity level of the first claim using applying natural language processing techniques to process the information;

creating a claim status interface page, the claim status interface page including an interactive graphical animation summarizing a status of the claim and including an overview of the pre-determined path including a predicted duration for each of the plurality of stages;

the claim status interface page further including status data in the form of an interactive graphical animation indicating whether one or more tasks associated with a given stage are pending or have been completed by the first policy holder;

presenting at a first time, via the application at the computing device associated with the first policy holder, the claim status interface page;

receiving, at the claim submission system, a second input from the first policyholder from an interaction by the first policyholder with the presented claims status interface page;

determining that the second input corresponds to execution by the first policyholder of a first task for a first stage of the pre-determined path;

automatically updating the claim status interface page, at a second time, by changing the interactive graphical animation status data to indicate that the first task has been completed by the first policyholder;

automatically generating, at the second time, a message indicating the first task has been completed and including information about a second task, the information about a second task including a link to an interface through which the second task can be accomplished;

identifying a communication channel based on preferences previously selected by the first policyholder for conveying alerts related to the first task; and transmitting the message to the first policyholder via their preferred communication channel.

2. The method of claim 1, further comprising:

passing information about the first claim, including a determination of a complexity level of the first claim, to a claims service level objective (SLO) model; and predicting, via the claims SLO model, how long completion of each stage in the pre-determined path will take based on the complexity level of the first claim.

3. The method of claim 1, further comprising identifying, via a similar claims model and based on the complexity level and previous claims data from other policyholders that have submitted claims, one or more prior claims that have a high likelihood of representing a claim scenario similar to that represented by the first claim.

4. The method of claim 3, further comprising determining, via a claims communication model, whether the first policyholder has opted in to receive notifications regarding the first claim, which channel they wish to receive messaging for each stage, and how often they wish to receive messaging.

5. The method of claim 4, wherein the method further comprises determining the predicted duration for each stage by:

passing information about the first claim and output of the similar claims model to a policyholder segmentation model; and identifying a first segment of other policyholders who have similar communication preferences as the first policyholder.

6. The method of claim 1, wherein the method further comprises determining the predicted duration for each stage based on policyholder metadata, claims metadata, insurance product metadata, and digital use metadata for the first policyholder.

7. The method of claim 1, further comprising:

determining that all tasks for the first stage are now complete; and updating, via the claims SLO model, how long completion of stages subsequent to the first stage in the pre-determined path will take based on metadata associated with tasks of the completed first stage.

8. A system for improving customer support experiences by proactive presentation of customer-specific information, the system comprising a processor and machine-readable media including instructions which, when executed by the processor, cause the processor to:

receive, at a claim submission system and from an application accessed via a computing device associated with a first policy holder of an insurance policy, a first input from the first policyholder;

automatically create and open, in response to the first input and at the claim submission system, a first claim related to an incident associated with the first policyholder, wherein processing of the first claim follows a pre-determined path including a plurality of stages;

pass information about the first claim to a claims com-
plexity model, the information including a description
of the incident, a loss type, and a number of people
involved in the incident;

determine, via the claims complexity model, the com-
plexity level of the first claim using applying natural
language processing (NLP) techniques to process the
information; and creating a claim status interface page, the claim status
interface page including an interactive graphical ani-
mation summarizing a status of the claim and including
an overview of the pre-determined path including a
predicted duration for each of the plurality of stages;

the claim status interface page further including status
data in the form of an interactive graphical animation
indicating whether one or more tasks associated with a
given stage are pending or have been completed by the
first policy holder;

presenting at a first time, via the application at the
computing device associated with the first policy
holder, the claim status interface page;

receiving, at the claim submission system, a second input
from the first policyholder from an interaction by the
first policyholder with the presented claims status inter-
face page;

determining that the second input corresponds to execu-
tion by the first policyholder of a first task for a first
stage of the pre-determined path;

automatically updating the claim status interface page, at
a second time, by changing the interactive graphical animation status data to indicate that the first task has
been completed by the first policyholder;

automatically generating, at the second time, a message
indicating the first task has been completed and includ-
ing information about a second task, the information
about a second task including a link to an interface
through which the second task can be accomplished;

identifying a communication channel based on prefer-
ences previously selected by the first policyholder for
conveying alerts related to the first task; and transmitting the message to the first policyholder via their
preferred communication channel.

9. The system of claim 8, wherein the instructions further
cause the processor to identify, via a similar claims model
and based on the complexity level and previous claims data
from other policyholders that have submitted claims, one or
more prior claims that have a high likelihood of representing
a claim scenario similar to that represented by the first claim.

10. The system of claim 8, wherein the instructions further
cause the processor to determine, via a claims communica-
tion model, whether the first policyholder has opted in to
receive notifications regarding the first claim, which channel
they wish to receive messaging for each stage, and how
often they wish to receive messaging.

11. The system of claim 8, wherein the system further
engages in predicting how long completion of each stage
will take based on policyholder metadata, claims metadata,
insurance product metadata, and digital use metadata for the
first policyholder.

* * * * *